United States Patent
Matsusue

(10) Patent No.: US 10,403,917 B2
(45) Date of Patent: Sep. 3, 2019

(54) FUEL CELL UNIT

(71) Applicant: TOYOTA JIDOSHA KABUSHIKI KAISHA, Toyota-shi Aichi-ken (JP)

(72) Inventor: Masaaki Matsusue, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 52 days.

(21) Appl. No.: 15/822,846

(22) Filed: Nov. 27, 2017

(65) Prior Publication Data

US 2018/0151903 A1  May 31, 2018

(30) Foreign Application Priority Data

Nov. 29, 2016 (JP) ................. 2016-231704

(51) Int. Cl.
H01M 8/06 (2016.01)
H01M 8/04089 (2016.01)
H01M 8/04746 (2016.01)
H01M 8/04186 (2016.01)

(52) U.S. Cl.
CPC ......... H01M 8/06 (2013.01); H01M 8/04089 (2013.01); H01M 8/04104 (2013.01); H01M 8/04186 (2013.01); H01M 8/04746 (2013.01)

(58) Field of Classification Search
CPC .. H01M 8/04104; H01M 8/04089; H01M 8/06; H01M 8/04; H01M 8/04746; H01M 8/04783

See application file for complete search history.

(56) References Cited

U.S. PATENT DOCUMENTS

| 2002/0064702 A1* | 5/2002 | Gibb | H01M 8/0213 429/492 |
| 2005/0064263 A1* | 3/2005 | Goebel | H01M 8/026 429/514 |
| 2008/0166622 A1 | 7/2008 | Shizuku et al. | |

FOREIGN PATENT DOCUMENTS

| JP | 2002343373 A | 11/2002 |
| JP | 2008-027752 A | 2/2008 |
| JP | 2008027752 A * | 2/2008 |
| JP | 2008171615 A | 7/2008 |
| JP | 2009-035458 A | 2/2009 |
| JP | 2011-146175 A | 7/2011 |
| JP | 2013-095618 A | 5/2013 |

* cited by examiner

Primary Examiner — Jonathan G Leong
Assistant Examiner — Heng M. Chan
(74) Attorney, Agent, or Firm — Hunton Andrews Kurth LLP

(57) ABSTRACT

A fuel cell unit includes: an ammonia pump including a pump cell that reduces an amount of ammonia in fuel gas; and a fuel cell including a power generation cell that is supplied with oxidant gas and the fuel gas. Each of the pump cell and the power generation cell has: a membrane electrode gas diffusion layer assembly; a first separator and a second separator; and a first gas channel and a second gas channel. In each of the pump cell and the power generation cell, the first gas channel and the second gas channel are formed such that an amount of pressure loss in the first gas channel is smaller than an amount of pressure loss in the second gas channel.

4 Claims, 8 Drawing Sheets

FUEL CELL UNIT

INCORPORATION BY REFERENCE

The disclosure of Japanese Patent Application No. 2016-231704 filed on Nov. 29, 2016 including the specification, drawings and abstract is incorporated herein by reference in its entirety.

BACKGROUND

1. Technical Field

The present disclosure related to a fuel cell unit.

2. Description of Related Art

An ammonia pump that reduces an amount of ammonia in fuel gas has been known. The fuel gas, in which the amount of ammonia has been reduced, is supplied to a power generation cell of a fuel cell, and degradation of power generation performance by the power generation cell is thereby suppressed. Such an ammonia pump includes a pump cell in which a membrane electrode gas diffusion layer assembly is held by paired separators from both sides, and this pump cell has a similar structure to the power generation cell (for example, see Japanese Patent Application Publication No. 2008-27752 (JP 2008-27752 A)).

SUMMARY

In the power generation cell, oxidant gas flows through a first gas channel that is defined between the membrane electrode gas diffusion layer assembly and one of the separators, and the fuel gas flows through a second gas channel that is defined between the membrane electrode gas diffusion layer assembly and the other separator. Here, in the case where air is used as the oxidant gas, an amount of the air that is equal to or more than five times of an amount of the oxidant gas required for a power generation reaction has to flow through an oxidant gas channel. Accordingly, the first gas channel and the second gas channel are formed such that an amount of pressure loss of the gas in the first gas channel is smaller than an amount of pressure loss of gas in the second gas channel in the case where the gas flows through the first gas channel and the second gas channel under the same condition. For this reason, similar to the power generation cell, in the case where the fuel gas, which is supplied to the power generation cell, flows through the second gas channel in the pump cell, pressure loss of the fuel gas is increased in the pump cell, which possibly results in supply of the fuel gas with an insufficient amount of the pressure to the power generation cell of the fuel cell.

The present disclosure provides a fuel cell unit in which an increase in pressure loss of fuel gas to be supplied to a fuel cell in an ammonia pump is suppressed.

The present disclosure is a fuel cell unit that includes: an ammonia pump including a pump cell that reduces an amount of ammonia in fuel gas; and a fuel cell including a power generation cell that is supplied with oxidant gas that is air and the fuel gas in which the amount of ammonia is reduced by the ammonia pump. Each of the pump cell and the power generation cell has: a membrane electrode gas diffusion layer assembly; first and second separators that hold the membrane electrode gas diffusion layer assembly between the first and the second separators; a first gas channel that is defined between the first separator and the membrane electrode gas diffusion layer assembly; and a second gas channel that is defined between the second separator and the membrane electrode gas diffusion layer assembly. In each of the pump cell and the power generation cell, the first gas channel and the second gas channel are formed such that an amount of pressure loss of gas in the first gas channel is smaller than that in the second gas channel in the case where the gas flows through the first gas channel and the second gas channel under the same condition. The first gas channel and the second gas channel are configured such that the oxidant gas flows through the first gas channel of the power generation cell, and the fuel gas flows through the first gas channel of the pump cell and flows through the second gas channel of the power generation cell.

According to the above configuration, the fuel gas that is supplied to the fuel cell flows through the first gas channel, in which the amount of the pressure loss is smaller than that in the second gas channel, in the ammonia pump. Therefore, an increase in the pressure loss in the ammonia pump is suppressed.

The fuel cell unit may be configured to include a guide plate configured to guide the fuel gas from the pump cell to the power generation cell and be located and stacked between the pump cell and the power generation cell.

The fuel cell unit may be configured that the pump cell has a discharge hole from which the fuel gas is discharged, that the power generation cell has a supply hole to which the fuel gas is supplied, that the guide plate has a fuel gas guide passage that guides the fuel gas from the discharge hole to the supply hole, and that the fuel gas guide passage extends in a stacking direction in which the pump cell and the power generation cell are stacked, and penetrates the guide plate.

The fuel cell unit may be configured that, in each of the pump cell and the power generation cell, the first gas channel and the second gas channel are formed such that the amount of the pressure loss in the first gas channel is smaller than the amount of pressure loss of gas in the second gas channel because a value obtained by dividing length of the first gas channel by a sum of channel cross-sectional areas of the first gas channel is smaller than a value obtained by dividing length of the second gas channel by a sum of channel cross-sectional areas of the second gas channel.

According to the present disclosure, the fuel cell unit in which an increase in the pressure loss of the fuel gas to be supplied to the fuel cell is suppressed in the ammonia pump can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
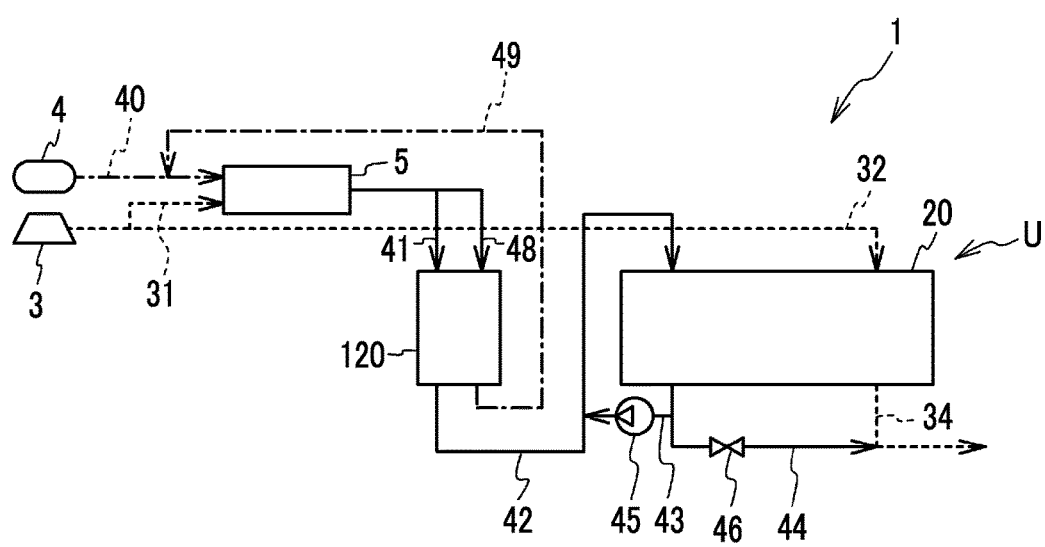
FIG. 1 is a configuration diagram of a fuel cell system.

FIG. 1 is a configuration diagram of a fuel cell system 1. The fuel cell system 1 includes an air compressor 3, a fuel tank 4, a reformer 5, a fuel cell unit U, and the like. The fuel cell unit U includes a fuel cell 20 and an ammonia pump 120. The fuel cell 20 generates electricity when being supplied with oxidant gas and fuel gas. The ammonia pump 120 reduces an amount of ammonia in the fuel gas to be supplied to the fuel cell 20. The reformer 5 uses raw fuel and water to produce the fuel gas that contains hydrogen, and supplies the produced fuel gas to the fuel cell 20. The raw fuel is, for example, raw fuel containing hydrocarbons such as town gas, propane gas, naphtha, gasoline, and heating oil, or alcohol-based raw fuel such as methanol. When the reformer 5 reforms any of these types of the raw fuel, ammonia is possibly produced as a by-product, and the produced fuel gas contains ammonia. In addition, there is a case where liquid ammonia is used as the raw fuel. Also, in this case, the fuel gas, which has been reformed by the reformer 5, contains the ammonia.

The air is supplied to the reformer 5 by the air compressor 3 via piping 31 and is supplied as the oxidant gas to a cathode side of the fuel cell 20 via piping 32. The oxidant gas that has flowed through the fuel cell 20 is discharged to outside via piping 34.

The raw fuel is stored in the fuel tank 4 and is supplied to the reformer 5 via piping 40. The raw fuel is reformed to the fuel gas by the reformer 5, and the fuel gas is then supplied to the ammonia pump 120 via piping 41 and 48. The fuel gas that has flowed through the ammonia pump 120 from the piping 41 is supplied to an anode side of the fuel cell 20 via piping 42. The fuel gas that has flowed through the fuel cell 20 is appropriately pressurized by a circulation pump 45 via piping 43 and is lead to the piping 42 again. Piping 44 joins the piping 34 to discharge the fuel gas that has been discharged from the fuel cell 20 to the outside. The piping 44 is provided with an exhaust valve 46 that regulates a circulation amount and a discharged amount of the fuel gas. The fuel gas that is supplied to the ammonia pump 120 via the piping 48 is supplied to the piping 40 again from the ammonia pump 120 via piping 49.

The ammonia pump 120 extracts ammonia from the fuel gas supplied from the piping 41 so as to reduce the amount of ammonia therein, and mixes extracted ammonia with the fuel gas supplied from the piping 48. In this way, the fuel gas in which the amount of ammonia is reduced is supplied to the fuel cell 20, and degradation of power generation performance by the fuel cell 20 is thereby suppressed. Meanwhile, the fuel gas that has been mixed with ammonia is supplied to the reformer 5 again from an upstream side. In this way, the fuel gas that has been mixed with ammonia is not directly supplied to the fuel cell 20; however, some of the fuel gas is supplied to the fuel cell 20 via the reformer 5. Therefore, an increase in fuel consumption is suppressed.

Figure 2:
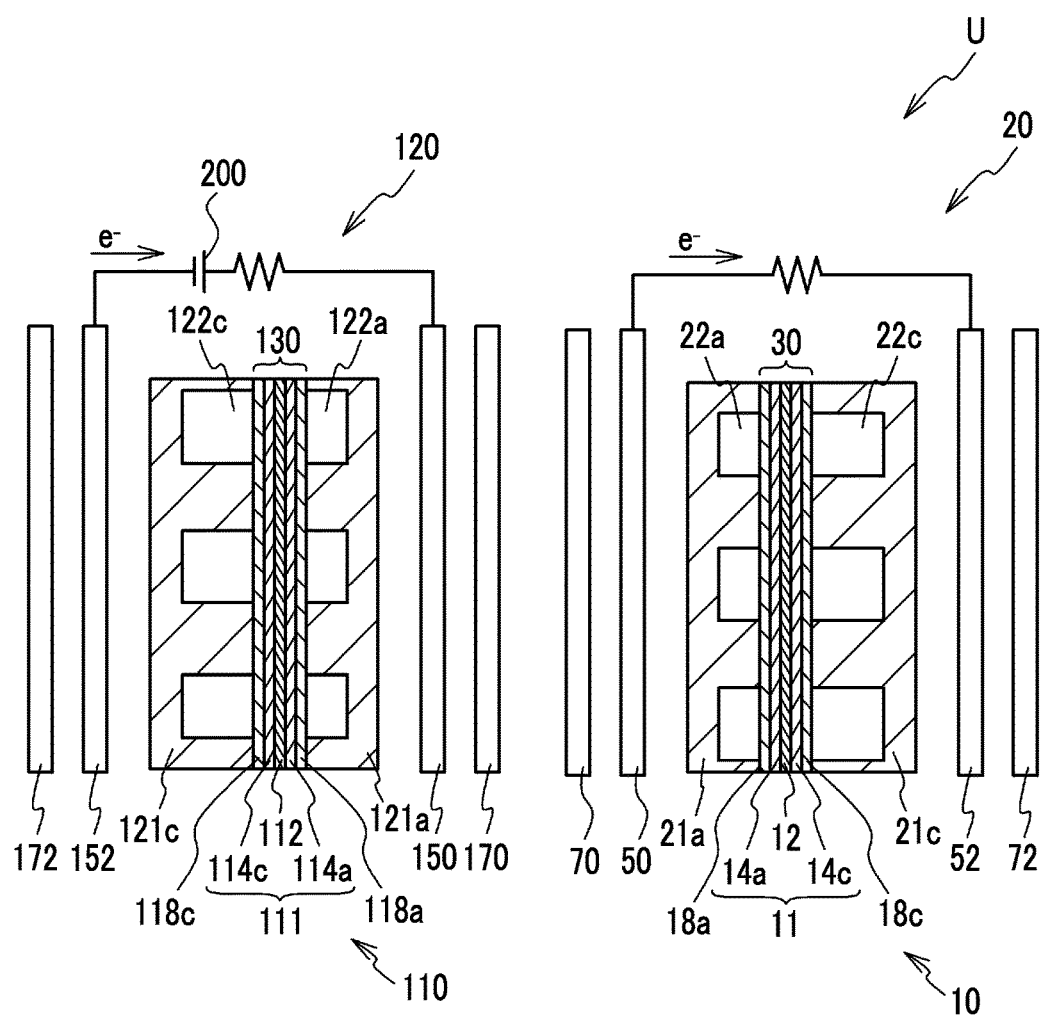
FIG. 2 is a schematic view of configurations of an ammonia pump and a fuel cell.

Next, a description will be made on specific configurations of the ammonia pump 120 and the fuel cell 20. FIG. 2 is a schematic view of the configurations of the ammonia pump 120 and the fuel cell 20. The fuel cell 20 has a stacking structure in which plural power generation cells 10 are stacked. FIG. 2 shows a cross section of the power generation cell 10. Each of the power generation cells 10 includes a membrane electrode assembly 11 (hereinafter referred to as a MEA) in which an anode-side catalyst layer 14a and a cathode-side catalyst layer 14c (hereinafter referred to as catalyst layers) are respectively formed on surfaces of an electrolyte membrane 12. The electrolyte membrane 12 is a solid polymer membrane that is formed of a fluorine-based resin material or a carbon-based resin material, and has favorable proton conductivity in a wet state. Each of the catalyst layers 14a and 14c contains: carbon particles (for example, carbon black) that carry a catalyst (for example, platinum or a platinum-cobalt alloy) promoting an electrochemical reaction; and an ionomer with the proton conductivity. The MEA 11 is held by an anode-side gas diffusion layer 18a and a cathode-side gas diffusion layer 18c (hereinafter referred to as diffusion layers). Each of the diffusion layers 18a and 18c is formed of a member with gas permeability and electron conductivity and is, for example, formed of a porous member made of carbon such as carbon cloth or carbon paper. However, each of the diffusion layers 18a and 18c is not limited to the above configuration and may be a porous metal body that is formed with an expanded section formed by lancing, for example. A membrane electrode gas diffusion layer assembly 30 (hereinafter referred to as MEGA) is constructed of these MEA 11 and diffusion layers 18a and 18c.

The MEGA 30 is held by an anode-side separator 21a and a cathode-side separator 21c (hereinafter referred to as separators). Each of the separators 21a and 21c is formed of a member with the gas permeability and the electron conductivity and is, for example, formed of a carbon member such as dense carbon that is formed by compressing carbon to prevent gas permeation or a metal member such as stainless steel formed by pressing. The separators 21a and 21c are formed in uneven shapes so as to respectively define gas channels 22a and 22c between each of the separators 21a and 21c and the MEGA 30. The gas channels 22a and 22c are formed in groove shapes in the separators 21a and 21c, respectively. During power generation by the power generation cells 10, the fuel gas flows through the gas channel 22a, and the oxidant gas flows through the gas channel 22c.

As shown in FIG. 2, the gas channel 22c is formed to have a larger channel cross-sectional area than the gas channel 22a. In detail, the gas channels 22a and 22c are formed such that an amount of pressure loss of the gas in the gas channel 22c is smaller than that in the gas channel 22a in the case where the gas flows through the gas channels 22a and 22c under the same condition. Furthermore, in detail, the gas channels 22a and 22c are formed such that the amount of the pressure loss in the gas channel 22c is smaller than that in the gas channel 22a because a value obtained by dividing length of the gas channel 22c by a sum of the channel cross-sectional areas of the gas channel 22c is smaller than a value obtained by dividing length of the gas channel 22a by a sum of the channel cross-sectional areas of the gas channel 22a. As described above, when the air is used as the oxidant gas, an amount of the air that is equal to or more than five times of an amount of the oxidant gas required for a power generation reaction in the power generation cell 10 has to be supplied to the power generation cell 10. For example, the pressure loss is increased as the gas channel is extended and as the sum of the channel cross-sectional areas is reduced. Note that the same condition corresponds to a case where atmospheric conditions such as a gas composition, humidity, a temperature, density, pressure, a flow rate per unit time, and the like are the same. The length of the gas channel corresponds to length of a groove-shaped gas channel through which the gas, which will be described below, flows from a supply hole, from which the gas is supplied to the gas channel, to a discharge hole, to which the gas is discharged, for example. The channel cross-sectional area is an area of the channel in a cross section that is perpendicular to a direction in which the channel extends. The sum of the channel cross-sectional areas is a sum of cross-sectional areas of the gas channel and corresponds to a volume thereof. Note that the gas channel may be of a parallel groove type or may be of a meandering groove type or a comb-shaped type. In the case of the parallel groove type, the length of the channel is a total of length of a supply groove that communicates with the supply hole, length of a discharge groove that communicates with the discharge hole, and total length of plural branched grooves that are branched from the supply groove in a substantially parallel manner and communicate with the discharge groove. In the case of the meandering groove type, the length of the channel is length of a groove that meanders from the supply hole to the discharge hole and communicates therewith. In the case where the gas channel is of the comb-shaped type, the length of the channel is a total of the length of the supply groove that communicates with the supply hole, the length of the discharge groove that communicates with the discharge hole, total length of plural branched supply grooves that are branched from the supply groove in the substantially parallel manner and do not communicate with the discharge groove, and total length of plural branched discharge grooves that are branched from the discharge groove in the substantially parallel manner, that do not communicate with the supply groove, and that are alternately arranged with the branched supply grooves.

In the fuel cell 20, a plurality of such power generation cells 10 is stacked and is held by paired terminal plates 50 and 52 and paired end plates 70 and 72. Each of the terminal plates 50 and 52 is made of metal and used to retrieve a voltage and a current from each of the power generation cells 10. Note that an insulating plate, which is not shown, is interposed between the terminal plate 50 and the end plate 70 and between the terminal plate 52 and the end plate 72.

Next, a description will be made on the ammonia pump 120. The ammonia pump 120 has a similar stacking structure to the fuel cell 20. FIG. 2 shows a cross section of a pump cell 110. Each of the pump cells 110 includes a membrane electrode assembly 111 (hereinafter referred to as a MEA) in which catalyst layers 114a and 114c are respectively formed on surfaces of an electrolyte membrane 112. The MEA 111 is held by a diffusion layer 118a and a diffusion layer 118c. A membrane electrode gas diffusion layer assembly 130 (hereinafter referred to as a MEGA) is constructed of these MEA 111 and diffusion layers 118a and 118c. The MEGA 130 is held by separators 121a and 121c. The separators 121a and 121c are formed in the uneven shapes so as to respectively define gas channels 122a and 122c between each of the separators 121a and 121c and the MEGA 130. In the ammonia pump 120, a plurality of such pump cells 110 is stacked and is held by paired terminal plates 150 and 152 and paired end plates 170 and 172. Note that the insulating plate, which is not shown, is interposed between the terminal plate 150 and the end plate 170 and between the terminal plate 152 and the end plate 172. Each of the terminal plates 150 and 152 is made of metal and is used to apply the voltage to the plural pump cells 110 from the outside. A positive electrode and a negative electrode of a battery 200 as a power supply of the ammonia pump 120 are respectively connected to the terminal plates 150 and 152.

The electrolyte membrane 112, the catalyst layers 114a and 114c, the diffusion layers 118a and 118c, the separators 121a and 121c, the terminal plates 150 and 152, the end plates 170 and 172 of the ammonia pump 120 are respectively the same members as the electrolyte membrane 12, the catalyst layers 14a and 14c, the diffusion layers 18a and 18c, the separators 21a and 21c, the terminal plates 50 and 52, and the end plates 70 and 72 of the fuel cell 20. In this way, manufacturing cost of the ammonia pump 120 is suppressed. The separators 21c and 21a respectively exemplify the first and second separators that hold the MEGA 30 therebetween. The separators 121c and 121a respectively exemplify the first and second separators that hold the MEGA 130 therebetween. The gas channel 22c is one example of the first gas channel that is defined between the separator 21c and the MEGA 30. The gas channel 22a is one example of the second gas channel that is defined between the separator 21a and the MEGA 30. The gas channel 122c is one example of the first gas channel that is defined between the separator 121c and the MEGA 130. The gas channel 122a is one example of the second gas channel that is defined between the separator 121a and the MEGA 130.

The number of the pump cells 110 is smaller than the number of the power generation cells 10. The large number of the power generation cells 10 is stacked in the fuel cell 20 in order to secure the generated power. Meanwhile, the small number of the pump cells 110 is sufficient in the ammonia pump 120 as long as the amount of ammonia in the fuel gas to be supplied to the fuel cell 20 can be reduced.

Next, the description will be made on a reduction in the amount of ammonia in the fuel gas. In a state where the voltage is applied to the plural pump cells 110, the fuel gas flows through the gas channel 122c from the above-described piping 41, and the fuel gas flows through the gas channel 122a from the above-described piping 48. The fuel gas that is reformed by the reformer 5 and is supplied to the pump cells 110 contains moisture. Accordingly, when the fuel gas flows through the gas channel 122c, ammonia in the fuel gas is dissolved in liquid water that is produced by dew condensation in the diffusion layer 118c, and ammonium ions and hydroxide ions are produced as expressed by an equation (1). Meanwhile, in the catalyst layer 114c, a dissociation reaction of hydrogen progresses as expressed by an equation (2). As a result, a neutralization reaction of protons and hydroxide ions progress on the gas channel 122c side of the MEA 111 as expressed by an equation (3). Thus, on the gas channel 122c side of the MEA 111, a chemical reaction appears to progress as expressed by an equation (4).

$$NH_3 + H_2O \rightarrow NH_4^+ + OH^- \tag{1}$$

$$(\tfrac{1}{2})H_2 \rightarrow H^+ + e^- \tag{2}$$

$$H^+ + OH^- \rightarrow H_2O \tag{3}$$

$$NH_3 + (\tfrac{1}{2})H_2 \rightarrow NH_4^+ + e^- \tag{4}$$

Because the electrolyte membrane 112 has a higher chemical affinity for ammonium ions than protons, ammonium ions that have produced on the gas channel 122c side are easily introduced into the electrolyte membrane 112 and reach the gas channel 122a side. In the catalyst layer 114a, a reduction reaction of ammonium ions progresses as expressed by an equation (5), and ammonium ions are reduced to ammonia.

$$NH_4^+ + e^- \rightarrow NH_3 + (\tfrac{1}{2})H_2 \tag{5}$$

Ammonia that has been produced in the catalyst layer 114a is mixed with the fuel gas flowing through the gas channel 122a and is discharged from the ammonia pump 120. In this way, the amount of ammonia is reduced from the fuel gas that flows through the gas channel 122c, and the fuel gas is then supplied to the fuel cell 20. Accordingly, ammonia content of the fuel gas to be supplied to the fuel cell 20 can be reduced, and the degradation of the power generation performance by the power generation cells 10 is thereby suppressed.

As described above, the fuel gas to be supplied to the fuel cell 20 flows through the gas channel 122c of the ammonia pump 120. Here, as described above, the amount of the pressure loss in the gas channel 122c is smaller than the amount of the pressure loss in the gas channel 122a. For this reason, the fuel gas to be supplied to the fuel cell 20 flows through the gas channel 122c, in which the amount of the pressure loss is small, rather than the gas channel 122a. In this way, the increase in the pressure loss in the ammonia pump 120 is suppressed. Accordingly, a reduction in the pressure of the fuel gas at a time point at which the fuel gas has passed the ammonia pump 120 and reached the fuel cell 20 can be suppressed, and the fuel gas at the desired pressure can flow through the gas channel 22a of the fuel cell 20. Therefore, degradation of power generation efficiency of the fuel cell 20 can also be suppressed.

Note that, in the above embodiment, the power generation cell 10 is the same as the pump cell 110; however, as long as the amount of the pressure loss in the first gas channel is smaller than the amount of the pressure loss in the second gas channel in each of the power generation cell 10 and the pump cell 110, all members do not have to be always the same. As long as the above requirement is met, for example, the separators 21c and 121c may be in different size and shapes, and the separators 21a and 121a may also be in different size and shapes. In addition, the diffusion layers 18c and 118c may be in different size and shapes, and the diffusion layers 18a and 118a may also be in different size and shapes. Furthermore, an area of each of the catalyst layers 114a and 114c only has to be large enough to reduce the amount of ammonia in the fuel gas. Thus, the areas of the catalyst layers 114a and 114c may respectively be smaller than areas of the catalyst layers 14a and 14c.

In the above embodiment, as shown in FIG. 1, ammonia is mixed with the fuel gas that has passed the reformer 5. However, the invention is not limited thereto. For example, the fuel gas that has been discharged from the fuel cell 20 may flow through the gas channel 122a of the ammonia pump 120 and be mixed with ammonia. However, in this case, an amount of moisture contained in the fuel gas that has been discharged from the fuel cell 20 changes in accordance with an operation state of the fuel cell 20. Thus, depending on the operation state of the fuel cell 20, the amount of moisture in the fuel gas that passes the gas channel 122a is possibly small, and the fuel gas cannot contain a sufficient amount of ammonium ions. In the case of the above embodiment, the amount of moisture in the fuel gas that is supplied to the ammonia pump 120 from the reformer 5 does not depend on the operation state of the fuel cell 20. Thus, the fuel gas that contains the substantially constant amount of moisture can be supplied to the ammonia pump 120.

Figure 3A:
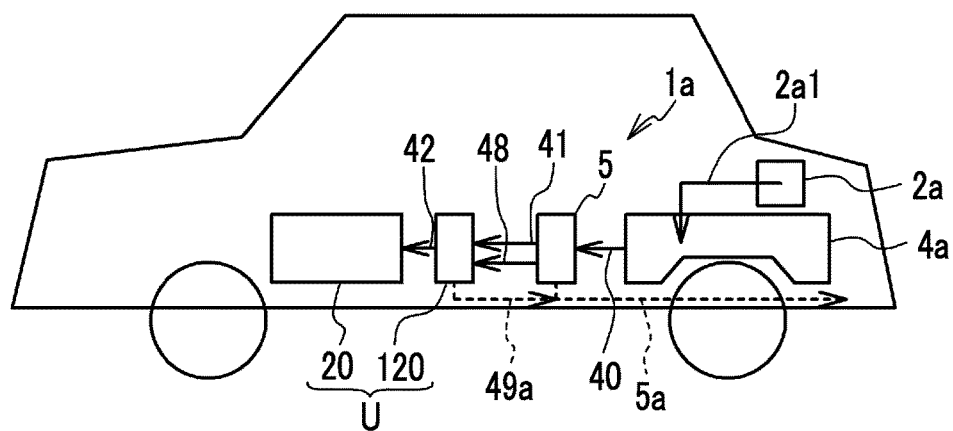
FIG. 3A is a view that exemplifies a case where a fuel cell system of a first modified example is mounted on a vehicle.

Next, a description will be made on a modified example of the fuel cell system. Note that the same configuration as that of the fuel cell system in the above embodiment will be denoted by the same reference signs and numerals and the description will not be repeated. FIG. 3A is a view that exemplifies a case where a fuel cell system 1a of a first modified example is mounted on a vehicle. As depicted in FIG. 3A, liquid raw fuel is stored in a fuel tank 4a from a supply port 2a via piping 2a1. The raw fuel stored in the fuel tank 4a is supplied to the reformer 5 via the piping 40. In the reformer 5, impurities that are produced during reformation of the raw fuel to the fuel gas are discharged to the outside of the vehicle via piping 5a. The fuel gas that has been deformed by the reformer 5 is supplied to the ammonia pump 120 via the piping 41 and 48. The amount of ammonia in the fuel gas that has been supplied to the ammonia pump 120 via the piping 41 is reduced in the ammonia pump 120, and the fuel gas is then supplied to the fuel cell 20 via the piping 42. The fuel gas that has been supplied to the ammonia pump 120 via the piping 48 is mixed with ammonia in the ammonia pump 120 and is then discharged to the outside via piping 49a. As described above, because the liquid raw fuel is stored in the fuel tank 4a, a freedom in shape of the fuel gas is greater than a gas tank. As it has been described so far, the fuel cell system 1a may be mounted on the vehicle.

Figure 3B:
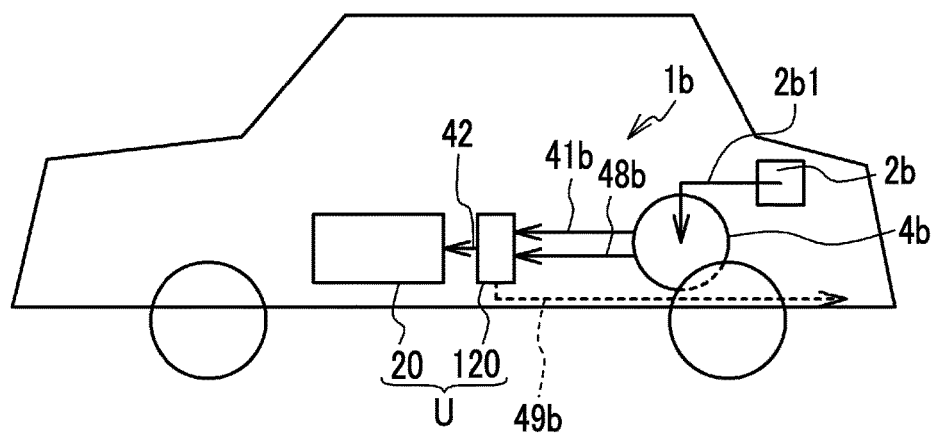
FIG. 3B is a view that exemplifies a case where a fuel cell system of a second modified example is mounted on the vehicle.

FIG. 3B is a view that exemplifies a case where a fuel cell system 1b of a second modified example is mounted on the vehicle. The gaseous fuel gas is stored in a gas tank 4b from a supply port 2b via piping 2b1. The fuel gas stored in the gas tank 4b is supplied to the ammonia pump 120 via piping 41b and 48b. The amount of ammonia in the fuel gas that has been supplied to the ammonia pump 120 via the piping 41b is reduced in the ammonia pump 120, and the fuel gas is then supplied to the fuel cell 20 via the piping 42. The fuel gas that has been supplied to the ammonia pump 120 via the piping 48b is mixed with ammonia in the ammonia pump 120 and is discharged to the outside via piping 49b. As described above, in the case where gas tank 4b that directly stores the fuel gas is provided and the fuel gas is supplied to the fuel cell 20 via the ammonia pump 120, the reformer is unnecessary. In addition, even in the case where the fuel gas that is supplied from a hydrogen station contains ammonia, for example, the amount of ammonia can appropriately be reduced by the above system.

Figure 4:
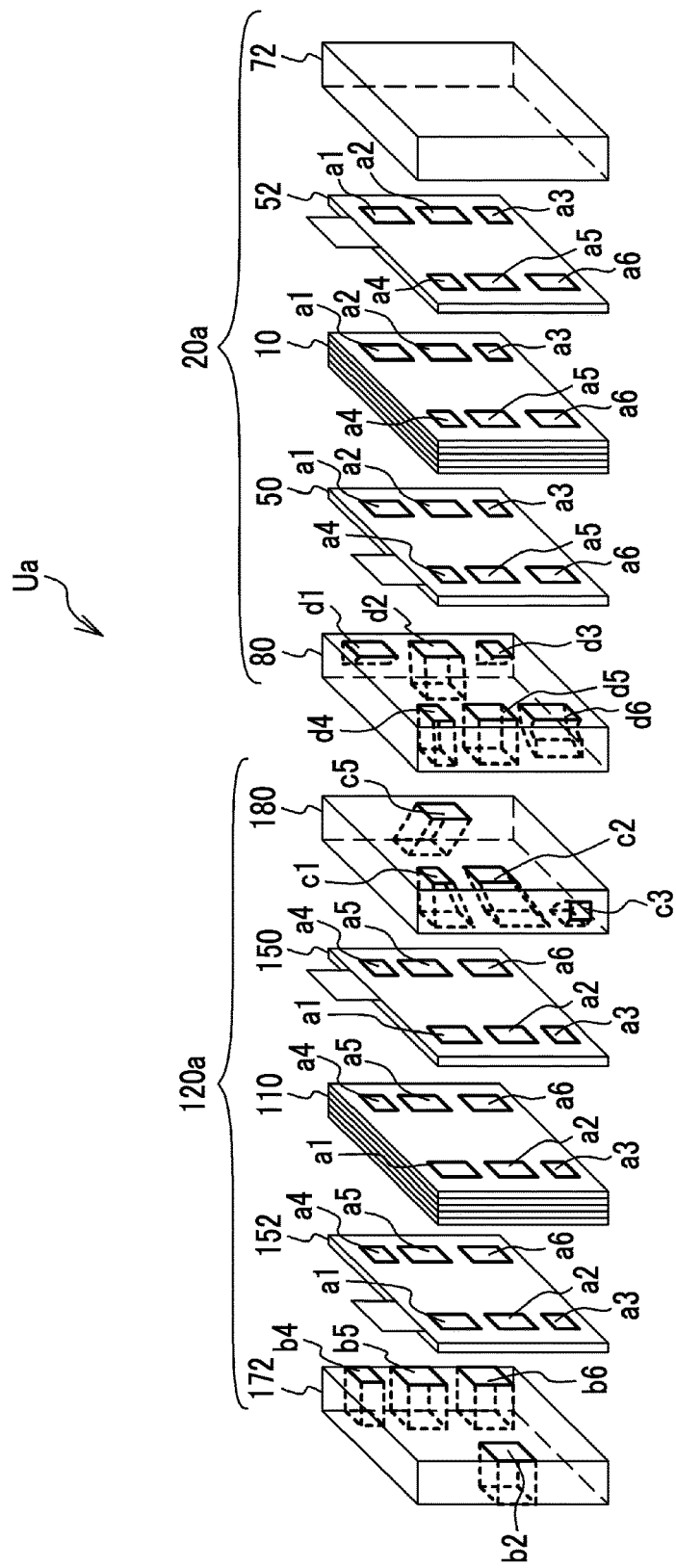
FIG. 4 is an exploded perspective view of the fuel cell unit of the first modified example.

Next, a description will be made on a fuel cell unit Ua of the first modified example. FIG. 4 is an exploded perspective view of the fuel cell unit Ua of the first modified example. In the fuel cell unit Ua, an ammonia pump 120a and a fuel cell 20a are integrated. The ammonia pump 120a includes the end plate 172, the terminal plate 152, the pump cells 110, the terminal plate 150, and a guide plate 180. The fuel cell 20a includes a guide plate 80, the terminal plate 50, the power generation cells 10, the terminal plate 52, and the end plate 72. In the fuel cell unit Ua, similar to the pump cells 110 and the power generation cells 10, the guide plates 180 and 80 are stacked between the end plates 172 and 72. The guide plates 180 and 80 have substantially the same shapes and dimensions as the power generation cells 10 and the pump cells 110 except for thickness and are thicker than the single power generation cell 10 and the single pump cell 110. Each of the guide plates 180 and 80 has an insulating property and is made of a synthetic resin, for example. Note that the same number of the power generation cells 10 and the pump cell 110 is shown in FIG. 4; however, the number of the power generation cells 10 is actually larger than the number of the pump cells 110.

First, a description will be made on the fuel cell 20a. Each of the power generation cell 10 and the terminal plates 50 and 52 is formed with holes a1 to a6. The holes a1 to a3 are formed along one lateral side of each of the power generation cell 10 and the terminal plates 50 and 52, each of which is formed in a substantially rectangular shape, and the holes a4 to a6 are formed along the other lateral side thereof.

The guide plate 80 is formed with passages d1 to d6 that respectively communicate with the holes a1 to a6 of the terminal plate 50. When a surface of the guide plate 80 that opposes the terminal plate 50 is set as a front surface, the passages d2, d4, and d5 extend in a manner to penetrate the guide plate 80 in a thickness direction from the front surface to a back surface. The passages d1 and d3 extend in a manner to be bent from the front surface of the guide plate 80 to a lateral surface thereof near the passages d1 and d3 and penetrate the guide plate 80. The passage d6 extends in a manner to be bent from the front surface of the guide plate 80 to a lateral surface near the passage d6 thereof and penetrate the guide plate 80. Note that the passages d2, d4, and d5 respectively communicate with the passages c5, c1, and c2 of the guide plate 180, which will be described in detail below. Here, the end plate 72 is not formed with holes and closes all of the holes a1 to a6 of the terminal plate 52.

In the fuel cell 20a, the passage d1 and the plural holes a1 communicate with each other and define an oxidant gas supply manifold through which the oxidant gas before being used for the power generation in the MEAs 11 of the power generation cells 10 flows. Similarly, the passage d6 and the plural holes a6 communicate with each other and define an oxidant gas discharge manifold through which the oxidant gas after being used for the power generation in the MEAs 11 of the power generation cells 10 flows. The passage d2 and the plural holes a2 communicate with each other and define a refrigerant supply manifold to which a refrigerant for cooling the power generation cells 10 is supplied. The passage d5 and the plural holes a5 communicate with each other and define a refrigerant discharge manifold from which the refrigerant is discharged. The passage d3 and the plural holes a3 communicate with each other and define a fuel gas discharge manifold through which the fuel gas after being used for the power generation in the MEAs 11 of the power generation cells 10 flows. The passage d4 and the plural holes a4 communicate with each other and define a fuel gas supply manifold through which the fuel gas before being used for the power generation in the MEAs 11 of the power generation cells 10 flows.

Next, a description will be made on the ammonia pump 120a. As described above, because the same members are used for the ammonia pump 120a and the fuel cell 20a, each of the pump cells 110 and the terminal plates 150 and 152 is formed with the holes a1 to a6. In addition, the pump cells 110 are stacked in an opposite direction from the power generation cells 10 such that the holes a1 to a3 of the power generation cells 10 respectively oppose the holes a4 to a6 of the pump cells 110 in a stacking direction and that the holes a4 to a6 of the power generation cells 10 respectively oppose the holes a1 to a3 of the pump cells 110 in the stacking direction. Accordingly, the terminal plates 150 and 50 oppose each other via the guide plates 180 and 80. The fuel cell 20a and the ammonia pump 120a are arranged such that the hole a4 of the power generation cells 10 is aligned with the hole a1 of the pump cells 110 in the stacking direction.

The end plate 172 is formed with a hole b2 and holes b4 to b6 in a manner to penetrate the end plate 172 in the thickness direction, and the hole b2 and the holes b4 to b6 respectively communicate with the hole a2 and the holes a4 to a6 of the terminal plate 152. In addition, the end plate 172 closes the holes a1 and a3 of the terminal plate 152.

The guide plate 180 has passages c1, c2, c3, and c5 that respectively communicate with holes a1, a2, a3, and a5 of the terminal plate 150. When a surface of the guide plate 180 that opposes the guide plate 80 is set as a front surface, the passages c1, c2, and c5 extend in a manner to penetrate the guide plate 180 in the thickness direction from the front surface to a back surface. Note that shapes of the passages c1, c2, and c5 are smoothly changed such that the passages c1, c2, and c5 respectively communicate with the passages d4, d5, and d2 of the guide plate 80. The passage c3 extends in a manner to be bent from the surface of the guide plate 180 opposing the terminal plate 150 to a lateral surface thereof near the passage c3 and penetrate the guide plate 180. The guide plate 180 closes the holes a4 and a6 of the terminal plate 150.

Figure 5:
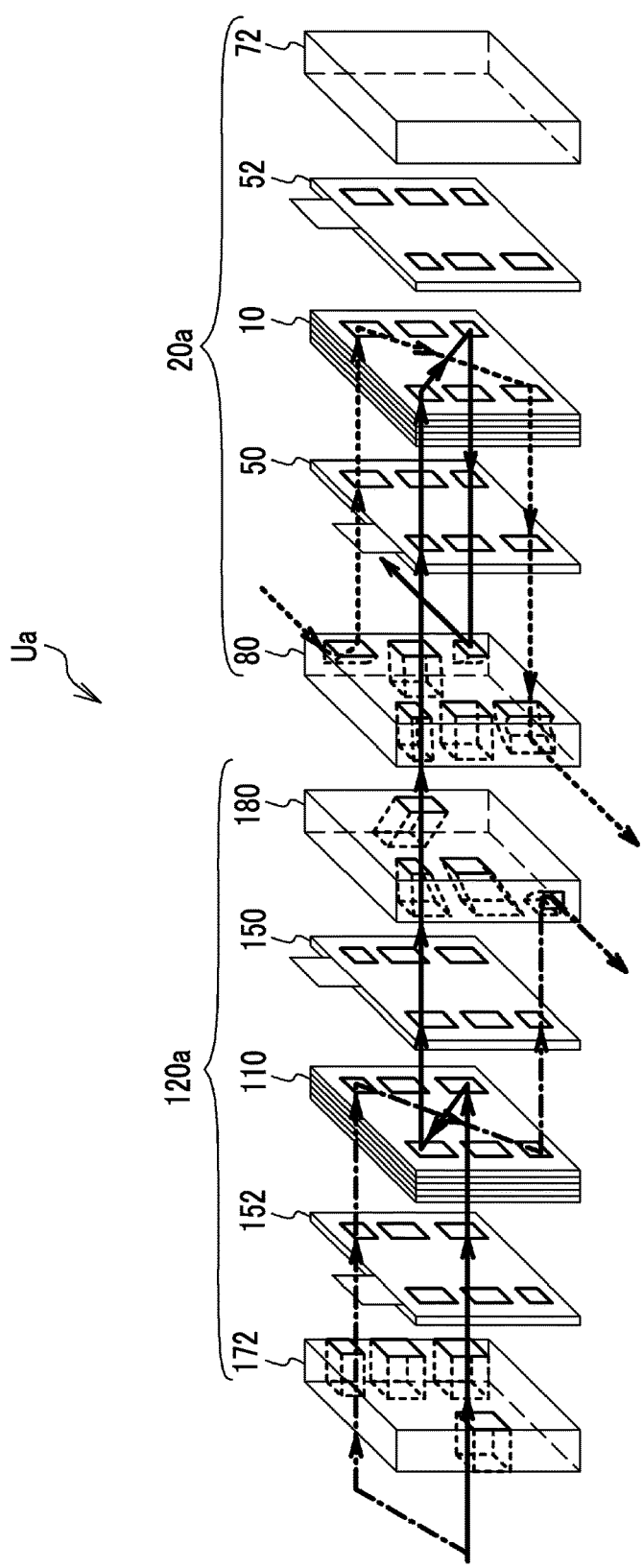
FIG. 5 is an exploded perspective view of the fuel cell unit of the first modified example.

Next, a description will be made on paths of the fuel gas and the oxidant gas that flow through the fuel cell unit Ua. FIG. 5 is an exploded perspective view of the fuel cell unit Ua of the first modified example, and some of the reference numerals are not shown in FIG. 5. A description will be made on the paths of the fuel gas and the oxidant gas that are supplied to the fuel cell 20a and the path of the fuel gas that is not supplied to the fuel cell 20a. First, a description will be made on the fuel gas that is supplied to the fuel cell 20a. In FIG. 5, this path is indicated by a solid arrow. The fuel gas that is supplied to the fuel cell 20a is supplied from the hole b6 of the end plate 172 to the hole a6 of the pump cells 110 in the ammonia pump 120a and flows through the gas channel 122c, and the amount of ammonia therein is reduced. Next, this fuel gas sequentially flows through the passage c1 of the guide plate 180, the passage d4 of the guide plate 80, and the hole a4 of the power generation cells 10 in the fuel cell 20a from the hole a1 of the ammonia pump 120a and flows through the gas channel 22a, and hydrogen in the fuel gas is used for the power generation. This fuel gas flows through the hole a3 of the power generation cells 10 and is discharged to the outside from the passage d3 of the guide plate 80.

Next, a description will be made on the path of the fuel gas that is not supplied to the fuel cell 20a. In FIG. 5, this path is indicated by a one-dot chain arrow. The fuel gas that is not supplied to the fuel cell 20a is supplied from the hole b4 of the end plate 172 to the hole a4 of the pump cells 110 in the ammonia pump 120a, flows through the gas channel 122a, and is mixed with ammonia. Next, this fuel gas flows through the hole a3 of the pump cell 110 and is discharged to the outside from the passage c3 of the guide plate 180.

Next, a description will be made on the path of the oxidant gas that is supplied to the fuel cell 20a. In FIG. 5, this path is indicated by a dotted arrow. The oxidant gas that is supplied to the fuel cell 20a is supplied to the hole a1 of the power generation cells 10 via the passage d1 of the guide plate 80 and flows through the gas channel 22c, and oxygen in the oxidant gas is used for the power generation. Next, this oxidant gas flows through the hole a6 of the power generation cells 10 and is discharged to the outside from the passage d6 of the guide plate 80.

Note that the refrigerant that cools the fuel cell 20a is supplied from the hole b5 of the end plate 172 in the ammonia pump 120a to the hole a2 of the power generation cells 10 via the hole a5 of the pump cells 110, the passage c5 of the guide plate 180, and the passage d2 of the guide plate 80. The refrigerant that has been supplied to the hole a5 of the pump cells 110 flows from the hole a2 of the pump cells 110 to the hole b2 of the end plate 172 via a refrigerant channel formed between two each of the pump cells 110 and is discharged to the outside. The refrigerant that has been supplied to the hole a2 of the power generation cells 10 flows through the passage d5 of the guide plate 80, the passage c2 of the guide plate 180, and the hole a2 of the pump cells 110 from the hole a5 of the power generation cells 10 via a refrigerant channel formed between two each of the power generation cells 10 and is discharged from the hole b2 of the end plate 172. As it has been described so far, the supply of the fuel gas in which the amount of ammonia is reduced to the fuel cell 20a, the supply of the oxidant gas to the fuel cell 20a, and cooling of the ammonia pump 120a and the fuel cell 20a are secured.

Here, as described above, the fuel gas in which the amount of ammonia is reduced by the ammonia pump 120a sequentially flows through the hole a1 of the pump cells 110, the passage c1 of the guide plate 180, the passage d4 of the guide plate 80, and the hole a4 of the power generation cells 10. The passage c1 of the guide plate 180 and the passage d4 of the guide plate 80 extend in the stacking direction thereof, so as to communicate the hole a1 of the pump cells 110 with the hole a4 of the power generation cells 10. In this way, by the passage c1 of the guide plate 180 and the passage d4 of the guide plate 80, the fuel gas in which the amount of ammonia is reduced and which is discharged from the ammonia pump 120a flows substantially linearly along the stacking direction. Accordingly, the increase in the pressure loss of the fuel gas to be supplied to the fuel cell 20 is suppressed by the guide plates 180 and 80. The hole a1 of the pump cells 110 is one example of the discharge hole from which the fuel gas is discharged. The hole a4 of the power generation cells 10 is one example of the supply hole to which the fuel gas is supplied. The passages c1 and d4 of the guide plates 180 and 80 are one example of a fuel gas guide channel that guides the fuel gas from the hole a1 of the pump cells 110 to the hole a4 of the power generation cells 10.

As described above, the ammonia pump 120a and the fuel cell 20a are integrated, and the fuel cell unit Ua is thereby downsized. In addition, the guide plates 180 and 80 are stacked between the ammonia pump 120a and the fuel cell 20a and connect the ammonia pump 120a and the fuel cell 20a. In this way, compared to a case where the ammonia pump 120a and the fuel cell 20a are connected by piping and the like, the number of components is reduced. Furthermore, the end plate 172, the pump cell 110, the power generation cells 10, the end plate 72, and the like can be stacked by including the guide plates 180 and 80 by a similar manufacturing method of an existing fuel cell stack. Thus, the fuel cell unit Ua can easily be manufactured, and an increase in manufacturing cost is suppressed.

The refrigerant can flow through not only the fuel cell 20a but also the ammonia pump 120a for cooling. Thus, while relative humidity within the ammonia pump 120a is secured, water condensation in the fuel gas that flows through the ammonia pump 120a can be secured. In this way, dissolution of ammonium ions in the fuel gas in condensed water is promoted, and thus the amount of ammonia can efficiently be reduced from the fuel gas to be supplied to the fuel cell 20a.

The oxidant gas that is supplied to the fuel cell 20a, the oxidant gas and the fuel gas that is discharged from the fuel cell 20a respectively flow through the passages d1, d6, d3 that are opened to the lateral surfaces of the guide plate 80. Just as described, even when the fuel cell 20a is integrated with the ammonia pump 120a, the supply of the oxidant gas to the fuel cell 20a and the discharge of the oxidant gas and the fuel gas from the fuel cell 20a are secured.

The guide plates 180 and 80 may not be formed integrally. The terminal plates 52 and 152 do not have to be always the same. For example, none of the holes a1 to a6 may be provided in the terminal plate 52, and the holes a1 and a3 may not be provided in the terminal plate 152.

A hole for discharging the fuel gas may be provided in the end plate 72. In this case, the passage d3 of the guide plate 80 is unnecessary. A hole for discharging the oxidant gas may be provided in the end plate 72. In this case, the passage d6 of the guide plate 80 is unnecessary. A hole for supplying the oxidant gas may be provided in the end plate 72. In this case, the passage d1 of the guide plate 80 is unnecessary. A hole for discharging the refrigerant may be provided in the end plate 72. In this case, the hole b2 of the end plate 172 is unnecessary. A hole for supplying the refrigerant may be provided in the end plate 72. In this case, the hole b5 of the end plate 172 is unnecessary.

Figure 6:
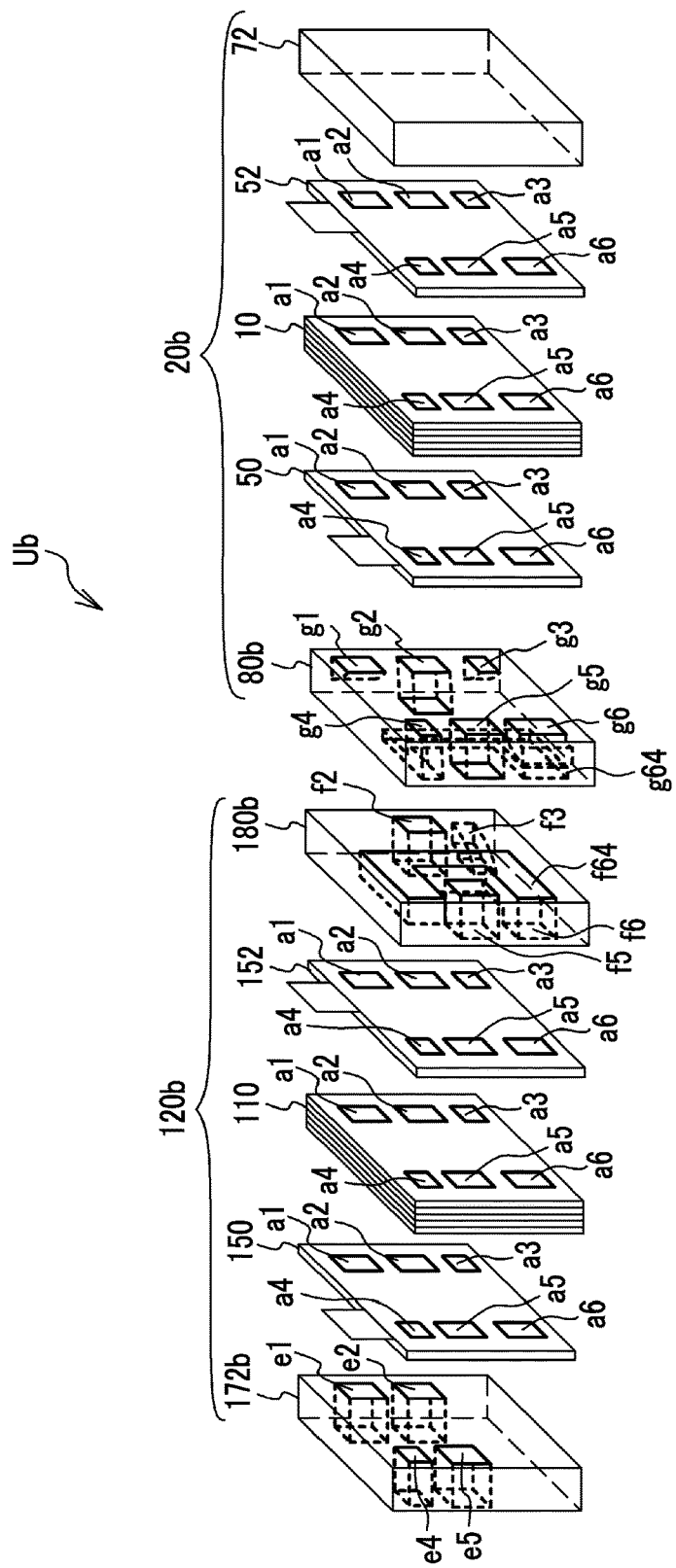
FIG. 6 is an exploded perspective view of the fuel cell unit of the second modified example.

Next, a description will be made on a fuel cell unit Ub of the second modified example. FIG. 6 is an exploded perspective view of the fuel cell unit Ub of the second modified example. In the fuel cell unit Ub, differing from the fuel cell unit Ua, the pump cells 110 and the terminal plates 150 and 152 of an ammonia pump 120b are stacked in the same direction as the power generation cells 10 and the terminal plates 50 and 52 of a fuel cell 20b. Accordingly, the holes a1 to a3 of the pump cells 110 are located on the same side as the holes a1 to a3 of the power generation cells 10, and the holes a4 to a6 of the pump cells 110 are located on the same side as the holes a4 to a6 of the power generation cells 10.

An end plate 172b is formed with holes e1, e2, e4, and e5 that respectively communicate with the holes a1, a2, a4, and a5 of the pump cells 110, extend in the thickness direction, and penetrate the end plate 172b.

A guide plate 180b has passages f2, f5, and f6 that respectively communicate with the holes a2, a5, and a6 of the pump cells 110. When a surface of the guide plate 180b that opposes a guide plate 80b is set as a front surface, the passages f2, f5, and f6 extend in a manner to penetrate the guide plate 180b from the front surface to a back surface. In addition, the guide plate 180b has a passage f3 that communicates with the hole a3 of the pump cells 110. The passage f3 extends in a manner to be bent from the back surface of the guide plate 180b to a lateral surface thereof near the passage f3 and penetrate the guide plate 180b. A groove f64 is formed on the front surface side of the guide plate 180b. When the guide plate 180b is seen from the front surface side, the groove f64 is formed in a substantially U shape around the passage f5. The groove f64 communicates with the passage f6. Note that the guide plate 180b closes the hole a1.

The guide plate 80b is formed with passages g1 to g6 that respectively communicate with the holes a1 to a6 of the power generation cells 10. When a surface of the guide plate 80b that opposes the terminal plate 50 is set as a front surface, the passages g2 and g5 extend in a manner to penetrate the guide plate 80b in the thickness direction from the front surface to a back side, and respectively communicate with the passages f2 and f5 of the guide plate 180b. The passages g1 and g3 extend in a manner to be bent from the front surface of the guide plate 80b to a lateral surface thereof near the passages g1 and g3 and penetrate the guide plate 80b. The passage g6 extends in a manner to be bent from the front surface of the guide plate 80b to a lateral surface thereof near the passage g6 and penetrate the guide plate 80b.

Figure 7A:
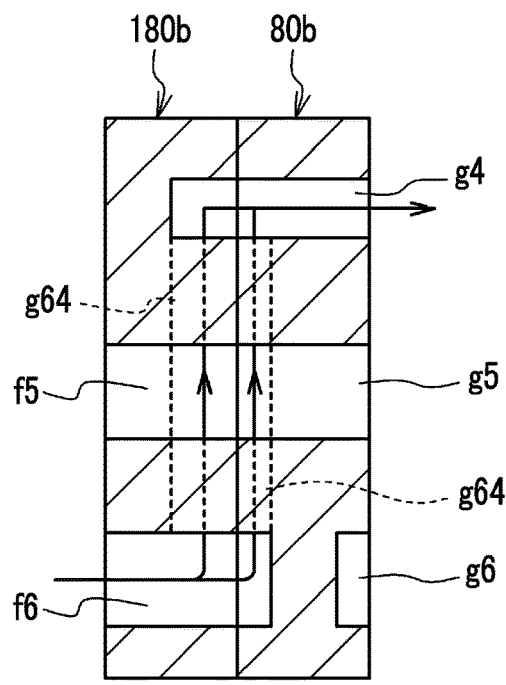
FIG. 7A is a cross-sectional view of stacked guide plates.
Figure 7B:
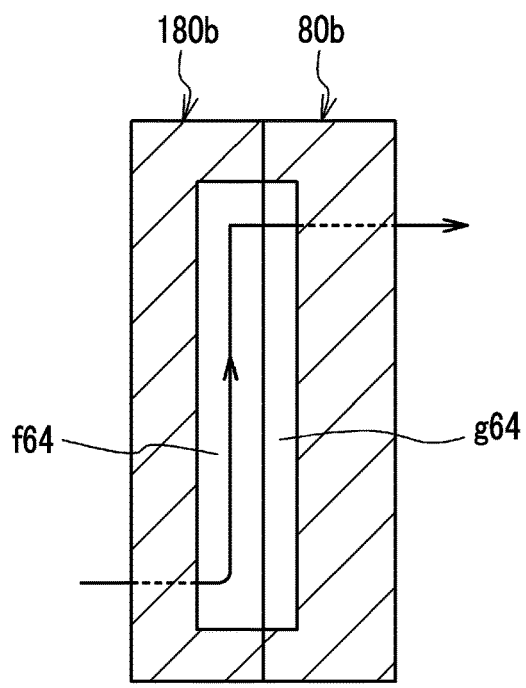
FIG. 7B is a cross-sectional view of the stacked guide plates.

A groove g64 is formed in the back surface of the guide plate 80b. When seen from the back surface side of the guide plate 80b, the groove g64 is formed in the substantially U shape around the passage g5. The groove g64 and the groove f64 have substantially the same shape, and the grooves g64 and f64 cooperatively define a single passage. Note that, although not communicating with the passage g6, the groove g64 communicates with the passage g4. Accordingly, the passages f6 and g4 communicate with each other via the grooves g64 and f64. FIG. 7A and FIG. 7B are cross-sectional views of the stacked guide plates 180*b* and 80*b*. FIG. 7A is a cross-sectional view in which the passages f6 and g4 appear. FIG. 7B is a cross-sectional view in which the grooves f64 and g64 appear.

Figure 8:
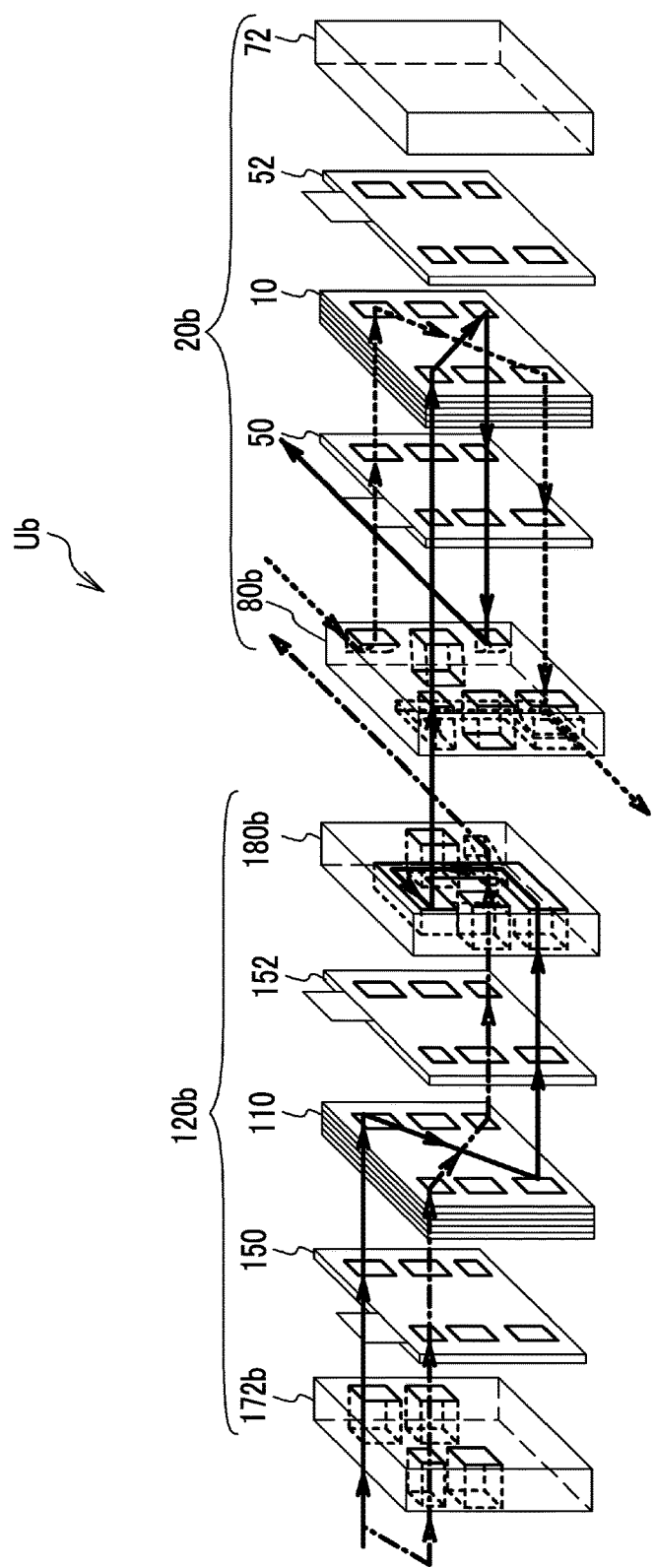
FIG. 8 is an exploded perspective view of the fuel cell unit of the second modified example.

Next, a description will be made on paths of the fuel gas and the oxidant gas that flow through the fuel cell unit Ub. FIG. 8 is an exploded perspective view of the fuel cell unit Ub of the second modified example, and some of the reference numerals are not shown in FIG. 8. FIG. 8 also shows the paths of the fuel gas and the oxidant gas by arrows. First, a description will be made on the path of the fuel gas that is supplied to the fuel cell 20*b*. This path is indicated by a solid arrow in FIG. 8. The fuel gas supplied to the fuel cell 20*b* is supplied from the hole e1 of the end plate 172*b* to the hole a1 of the pump cells 110 and flows through the gas channel 122*c*, and the amount of ammonia therein is reduced. Next, this fuel gas sequentially flows through the hole a6 of the pump cells 110, the passage f6 of the guide plate 180*b*, the groove f64 of the guide plate 180*b*, the groove g64 of the guide plate 80*b*, the passage g4 of the guide plate 80*b*, and the hole a4 of the power generation cells 10 and flows through the gas channel 22*a*, and hydrogen in the fuel gas is used for the power generation. This fuel gas flows through the hole a3 of the power generation cells 10 and is discharged to the outside from the passage g3 of the guide plate 80*b*. Note that each of FIG. 7A and FIG. 7B also shows a direction in which the fuel gas that is supplied to the fuel cell 20*b* flows by an arrow.

As indicated by a one-dot chain arrow in FIG. 8, the fuel gas that is not supplied to the fuel cell 20*b* is supplied from the hole e4 of the end plate 172*b* to the hole a4 of the pump cells 110, flows through the gas channel 122*a*, and is mixed with ammonia. Next, this fuel gas flows through the hole a3 of the pump cells 110 and is discharged to the outside from the passage f3 of the guide plate 180*b*.

As indicated by a dotted arrow in FIG. 8, the oxidant gas that is supplied to the fuel cell 20*b* is supplied to the hole a1 of the fuel cell 20*b* via the passage g1 of the guide plate 80*b* and flows through the gas channel 22*c* of the power generation cells 10, and oxygen therein is used for the power generation. Next, this oxidant gas flows through the hole a6 of the fuel cell 20*b* and is discharged to the outside from the passage g6 of the guide plate 80*b*.

Note that the refrigerant for cooling the fuel cell 20*b* is supplied from the hole e2 of the end plate 172*b* to the hole a2 of the pump cells 110 and is then supplied to the hole a2 of the power generation cells 10 via the passage f2 of the guide plate 180*b* and the passage g2 of the guide plate 80*b*. The refrigerant that has been supplied to the hole a2 of the pump cells 110 flows from the hole a5 of the pump cells 110 to the hole e5 of the end plate 172*b* via the refrigerant channel formed between two each of the pump cells 110 and is discharged to the outside. The refrigerant that has been supplied to the hole a2 of the power generation cells 10 flows from the hole a5 of the power generation cells 10 to the passage g5 of the guide plate 80*b*, the passage f5 of the guide plate 180*b*, and the hole a5 of the pump cells 110 via the refrigerant channel formed between two each of the power generation cells 10, and is discharged from the hole e5 of the end plate 172*b*.

Also, in such a fuel cell unit Ub, the ammonia pump 120*b* and the fuel cell 20*b* are integrated, and the fuel cell unit Ub is thereby downsized. In addition, an increase in the number of components thereof is suppressed. Furthermore, because the pump cells 110 and the power generation cells 10 are stacked in the same direction, a manufacturing process thereof is simplified.

The hole for discharging the fuel gas may be provided in the end plate 72. In this case, the passage g3 of the guide plate 80*b* is unnecessary. The hole for discharging the oxidant gas may be provided in the end plate 72. In this case, the passage g6 of the guide plate 80*b* is unnecessary. The hole for supplying the oxidant gas may be provided in the end plate 72. In this case, the passage g1 of the guide plate 80*b* is unnecessary. The hole for discharging the refrigerant may be provided in the end plate 72. In this case, the hole e5 of the end plate 172*b* is unnecessary. The hole for supplying the refrigerant may be provided in the end plate 72. In this case, the hole e2 of the end plate 172*b* is unnecessary.

The detailed description has been made so far on the embodiment of the invention. However, the present disclosure is not limited to the specific embodiment, and various modifications and changes can be made thereto within the scope of the gist of the present disclosure described in the claims.

What is claimed is:

1. A fuel cell unit comprising:
   an ammonia pump including a pump cell that reduces an amount of ammonia in fuel gas; and
   a fuel cell including a power generation cell that is supplied with oxidant gas and the fuel gas in which the amount of ammonia is reduced by the ammonia pump, the oxidant gas being air, wherein
   each of the pump cell and the power generation cell includes: a membrane electrode gas diffusion layer assembly; a first separator and a second separator that hold the membrane electrode gas diffusion layer assembly between the first separator and the second separator; a first gas channel that is defined between the first separator and the membrane electrode gas diffusion layer assembly; and a second gas channel that is defined between the second separator and the membrane electrode gas diffusion layer assembly,
   in each of the pump cell and the power generation cell, the first gas channel and the second gas channel are formed such that an amount of pressure loss of gas in the first gas channel is smaller than an amount of pressure loss of gas in the second gas channel in a case where the gas flows through the first gas channel and the second gas channel under the same condition, and
   the first gas channel and the second gas channel are configured such that the oxidant gas flows through the first gas channel of the power generation cell, and the fuel gas flows through the first gas channel of the pump cell and flows through the second gas channel of the power generation cell.

2. The fuel cell unit according to claim 1 further comprising a guide plate configured to guide the fuel gas from the pump cell to the power generation cell and be located and stacked between the pump cell and the power generation cell.

3. The fuel cell unit according to claim 2, wherein
   the pump cell includes a discharge hole from which the fuel gas is discharged,
   the power generation cell includes a supply hole to which the fuel gas is supplied, the guide plate includes a fuel gas guide passage that guides the fuel gas from the discharge hole to the supply hole, and the fuel gas guide passage extends in a stacking direction in which the pump cell and the power generation cell are stacked, and penetrates the guide plate.

4. The fuel cell unit according to claim 1, wherein in each of the pump cell and the power generation cell, the first gas channel and the second gas channel are formed such that a value obtained by dividing length of the first gas channel by a sum of channel cross-sectional areas of the first gas channel is smaller than a value obtained by dividing length of the second gas channel by a sum of channel cross-sectional areas of the second gas channel, causing the amount of the pressure loss in the first gas channel to be smaller than the amount of pressure loss of gas in the second gas channel.

* * * * *